D. PETTENGILL.
APPARATUS FOR SEPARATING CREAM FROM MILK.
No. 182,700. Patented Sept. 26, 1876.
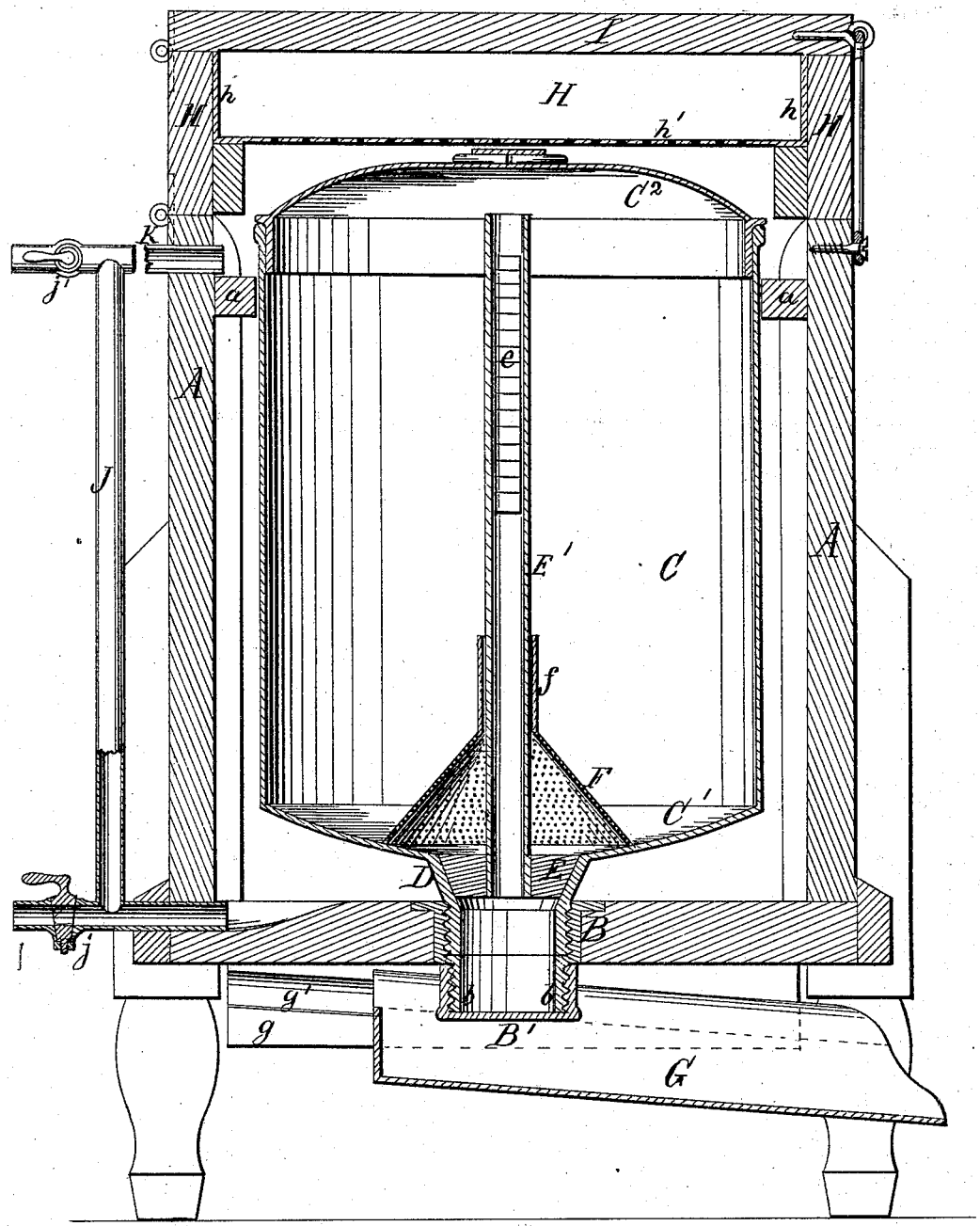
Witnesses:
J. P. Theodore Laug.
James Martin Jr.
Inventor:
Dexter Pettengill
by
Mason, Fenwick & Lawrence
attys.

UNITED STATES PATENT OFFICE.

DEXTER PETTENGILL, OF DELHI, NEW YORK.

IMPROVEMENT IN APPARATUS FOR SEPARATING CREAM FROM MILK.

Specification forming part of Letters Patent No. 182,700, dated September 26, 1876; application filed August 26, 1876.

*To all whom it may concern:*

Be it known that I, DEXTER PETTENGILL, of Delhi, in the county of Delaware and State of New York, have invented a new and useful Improvement in Cream-Machines for the Deep Setting of Milk, which improvement is fully set forth in the following specification, reference being had to the accompanying drawings, in which I have shown a vertical central section of my improved cream-machine for the deep setting of milk.

My invention consists of certain constructions, combinations, and arrangements of parts, hereinafter described and specifically claimed, whereby a vessel for cooling milk and for separating the cream therefrom is produced.

The object of my invention is to cool milk in large quantities, to keep it cool while the cream rises upon its surface, so as to keep the milk sweet, and to draw off milk and cream separately without great labor.

In the drawings, A represents a strong box or other vessel, in the bottom of which a metal nut, B, is fastened. A milk-vat, C, is, by means of a threaded bottom funnel, D, screwed to the nut B, and thereby so secured to the box A that its concave bottom $C^1$ is sufficiently elevated above the bottom of the box A to allow free circulation of cold water between them. The space between the vat C and the box A is filled with cold water, of which there is a constant supply. The said vat is steadied between the inner sides of the box A by bearing-blocks $a$, and closed by a lid, $C^2$. The funnel D is closed by a plug, E, made, by preference, of india-rubber, which is provided with a central glass tube, E'. The said glass tube is open at both ends, and is near the top provided with a scale, $e$, whereby the depth of the rising cream may be observed, and the quality of the milk adjudged. The funnel D is completely separated from the other part of the vat C by a conical strainer, F, which rests upon the bottom $C^1$ of the vat, and by means of a tube, $f$, is fitted to the tube E', and kept in a central position. The lower part $b$ of the nut B projects below the bottom of the box A, and is there provided with a screw-thread, upon which a tight cap, B', is screwed, whereby the water is prevented from leaving the box A when the vat is removed from it. An inclined trough, G, supported between two parallel blocks, $g$, with inclined grooves $g'$, into which the rims of the said trough are fitted, serves to conduct the milk away when the vat is emptied. Above the box A, and hinged thereto, is an ice-box, H, with metal lining $h$ and perforated bottom $h'$, which is closed by a lid, I. A pipe, J, for water-supply is connected with the box A at its bottom, where it is provided with a draw-off cock, $j$. A supply and cut-off cock, $j'$, is attached to the upper part of the said supply-pipe J. A waste-pipe, K, near the top of the vat conducts the waste water from the box A while in operation.

Operation: After the vat C has been thoroughly cleaned, the cap B' screwed tight on the nut B, and the funnel closed by the plug E, and the strainer F put in position, the milk is poured in, and the vat covered with the lid $C^2$. The ice-bar H is then swung over and closed by the lid I. The cock $j'$ is then opened, and water led into the box A, which, on rising near the top of the vat C, is conducted away by the waste-pipe K. If the water in the box A should not be sufficiently cold the cock $j'$ is closed, and the ice-box H supplied with ice, which, by slowly melting, causes a spray of intensely cold water to descend through the perforated bottom $h'$ upon the lid $C^2$ of the vat C, and thereby prevents the formation of acids above the milk. The milk is left undisturbed and cool until, by examining the glass tube E, it is found that a sufficient quantity of cream has collected at the surface, when the cap B' is removed from the funnel D of the vat C, the trough G adjusted in place, and the plug E removed. The milk now passes through the strainer F, leaving the cream behind, and it then passes through the open funnel D, and into the trough G, whence it is conducted into other vessels.

The milk so treated is perfectly free from cream without losing its sweetness or fresh flavor. The separation of the cream is going on rapidly on account of the great weight of the milk, whereby the small parts of cream become easier detached and raised to the surface of the milk. The cream is pure and sweet, and therefore furnishes a finer quality of butter than cream which has been in contact with atmospheric air, and in consequence thereof has been impregnated with acids.

I am aware that milk has been kept cool in closed vessels; but this, to my knowledge, has not been done with a view to promote the separation of cream, nor, with the means shown by invention, for adjusting the temperature at will.

Having described my invention, what I claim as new, and desire to secure by Letters Patent, is—

1. The apparatus consisting of the box A, the swinging ice-box H, the vat C, the supply-pipe J, and the waste-pipe K, all constructed and operating substantially as set forth.

2. The combination of the vat C, the tube E', the plug-valve E, the funnel D, and the strainer F, constructed and operating substantially as set forth.

3. The combination of the vat C, the funnel D, the nut B, and the cap B', constructed and operated substantially as set forth.

Witness my hand in the matter of my application for a patent on a cream-machine for the deep setting of milk this 19th day of August, 1876.

DEXTER PETTENGILL.

Witnesses:
    WELLS R. WHITNEY,
    E. D. CUMMING.